Patented June 14, 1949

2,473,475

UNITED STATES PATENT OFFICE 2,473,475

WATER-SOLUBLE TRIAZINE CONDENSATION PRODUCTS AND A PROCESS OF MAKING SAME

Ernst Keller and Reinhard Zweidler, Basel, Switzerland, assignors to J. R. Geigy A. G., Basel, Switzerland, a Swiss firm No Drawing. Application May 22, 1944, Serial No. 536,820. In Switzerland June 28, 1943

12 Claims. (Cl. 260—249.5)

We have found that valuable new, water-soluble condensation products are obtained by causing aminostilbene derivatives containing two 1:3:5-triazine rings, of which at least one must contain a free amino group, and containing water-solubilising groups like sulfonic acid or carboxylic acid groups to interact in a neutral or alkaline solution with formaldehyde or with compounds yielding formaldehyde. For the said interaction, beside formaldehyde, especially also polymerisation products thereof are suitable.

As aminostilbene derivatives which are suitable as starting products for the condensation with the aldehyde, there may be enumerated for example:

4:4' - (bis - [2 - amino - 4 - phenylamino - 1:3:5-triazyl - (6)]) - diaminostilbene - 2:2' - disulfonic acid;

4:4' - (bis - [2-amino-4-{m-sulfophenyl-}amino-1:3:5 - triazyl - (6)])-diaminostilbene-2:2'-disulfonic acid;

4:4' - (bis - [2 - amino - 4 - {m-carboxyphenyl-} amino - 1:3:5 - triazyl-(6)])-diaminostilbene-2:2'-disulfonic acid;

4:4' - (bis - [2:4 - diamino - 1:3:5-triazyl-(6)])-diaminostilbene-2:2'-disulfonic acid, etc.

The new water-soluble condensation products prepared according to the present invention are distinguished by a good affinity for cellulosic materials and may be used for the most various purposes. Thus they may be used for the production of finishings which are fast to boiling water, if desired in combination with suitable additional products, such as starch and the like, and for instance with acid catalysts and after a hot treatment. Besides, the condensation products possess the valuable properties of brightening organic materials of white to yellowish-white aspect, into which the condensation products have been incorporated, in such a manner that in daylight the brightening effect is practically equivalent to a very good bleaching effect. The materials treated with the said condensation products show in ultraviolet light a strong blue to white-blue fluorescence. In view of their good substantivity the condensation products may easily be applied to cellulosic materials, e. g. during the washing, during a refining method or during the dyeing or printing. Principally they may be used in all cases, where a brightening of a whitish or yellowish-white organic material containing especially cellulose seems to be desirable.

In U. S. Letters Patent 2,089,413 the use of aminostilbene derivatives, like for instance 4:4'-dibenzoyl-diaminostilbene disulfonic acid, 4:4'-di - (p - aminobenzoyl - amino - )-stilbene-2:2'-disulfonic acid, for the purpose of brightening textiles is disclosed. In contradistinction to the products of the cited patent the new compounds are, in general, distinguished by a much more intensive brightening effect, by better fastness properties to washing, to acids and to alkalis as well as by a better stability to alkalis and partly also by a better light-fastness. Moreover, from Swiss Patent 224,613 washing agents have become known, which, beside substances of cleaning character, still contain aminostilbene compounds containing one or more 1:3:5-triazine rings in the molecule. However, the new condensation products obtainable according to the present invention show generally a more beautiful, purer white effect and partly better fastness properties to washing, to acids and to alkalis than the products disclosed in the said Swiss patent.

The invention will now be illustrated, but not limited by the following examples, wherein the parts are by weight.

Example 1

58.8 parts of 4:4' -(bis-[2:4-diamino-1:3:5-triazyl-(6)]) - diaminostilbene-2:2' - disulfonic acid of the formula

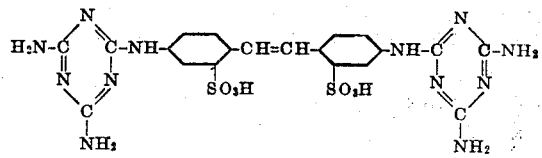

are heated to 70°–80° C. with 200 parts of water and with 200 parts of a 30% formaldehyde solution at a slightly alkaline reaction (so that phenolphthalein paper becomes just slightly red). By a further addition of caustic soda lye the reaction medium is maintained in a slightly alkaline condition. After 1 to 2 hours the yellowish solution which is now nearly clear is allowed to cool down, diluted with water and, if necessary, still clarified. The slightly yellow solution may be used as such, for instance for brightening cellulosic materials.

By addition of sodium chloride to the aqueous reaction solution the condensation product may be precipitated in form of a slightly yellowish colored powder. The condensation product which is preferably dried at a low temperature is clearly soluble in water to a slightly yellowish coloration and yields for example on cellulosic fibres an excellent brightening effect of very good fastness properties to acids, to alkalis, to washing and to light.

Instead of the 2:2'-disulfonic acid compound the corresponding 2:2'-dicarboxylic acid compound can be used with the same effect.

Example 2

58.8 parts of 4:4'-(bis-[2:4-diamino-1:3:5-triazyl-(6)])-diaminostilbene - 2:2' - disulfonic acid are condensed for 1 to 2 hours at 70°–80° C.

with 200 parts of water and 100 parts of 30% formaldehyde at an alkaline reaction to Brilliant Yellow paper and isolated in the manner described above. Thus a product having similar properties to those of the product according to Example 1 is obtained.

The condensation temperature may also be decreased for example to 50°–60° C. or be raised to 90°–100° C., while extending the condensation duration, when working at a lower temperature, and shortening the condensation duration, when working at a higher temperature.

*Example 3*

90 parts of 4:4'-(bis-[2-amino-4-{m-sulfophenyl-}amino - 1:3:5-triazyl-(6)]) - diaminostilbene-2:2'-disulfonic acid of the formula

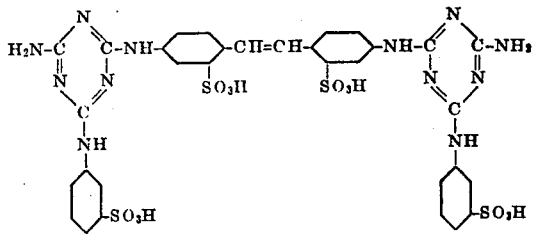

200 parts of water and 80 parts of 30% formaldehyde are condensed for 1–2 hours at 70°–80° C. at a slightly alkaline reaction to phenolphthalein. The easily soluble condensation product may be used directly in aqueous solution or it may be precipitated by means of sodium chloride and isolated.

*Example 4*

83 parts of 4:4'-(bis-[2-amino-4-{m-carboxyphenyl-}amino - 1:3:5-triazyl-(6)]) - diamino stilbene-2:2'-disulfonic acid of the formula

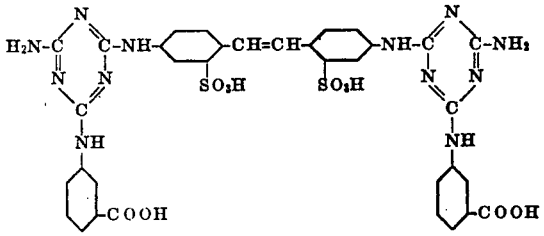

or the corresponding o-carboxy compound are condensed for 1–2 hours at 70°–80° C. with 200 parts of water and 80 parts of 30% formaldehyde at a slightly alkaline reaction. The readily water-soluble condensation product can also be precipitated with sodium chloride and isolated in the usual manner.

*Example 5*

74.4 parts of 4-(2:4-diamino-1:3:5-triazyl)-amino-4'-[2-amino-4-(3''-sulfophenyl) - amino-1:3:5-triazyl]-amino - stilbene - 2:2' - disulfonic acid of the formula

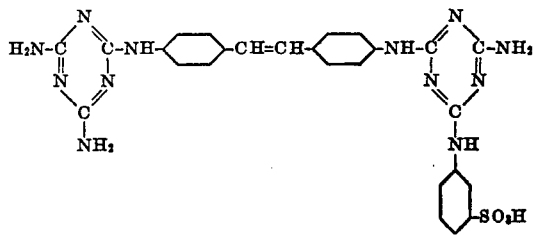

are condensed for 1–2 hours at 70°–80° C. with 200 parts of water and 140 parts of 30% formaldehyde at a slightly alkaline reaction. The condensation product may be precipitated and isolated in the manner described in the foregoing examples.

As can be clearly seen from the foregoing illustrative examples, an excess of formaldehyde is always employed therein, i. e. more than one mol of formaldehyde per amino group.

What we claim is:

1. A process for the manufacture of a water-soluble condensation product, which comprises heating in alkaline solution for a period of one to several hours a stilbene-triazine compound of the formula

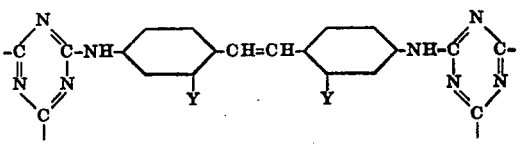

wherein the Y's represent identical members selected from the class consisting of the sulfonic acid group and the carboxylic acid group, and wherein at least one of the free valencies is taken up by an amino group, the remaining free valencies being taken up by a member selected from the group consisting of amino, phenylamino, sulfophenylamino and carboxyphenylamino, with an excess of formaldehyde.

2. A process for the manufacture of a water-soluble condensation product, which comprises heating in alkaline solution for a period of one to several hours a stilbene-triazine compound of the formula

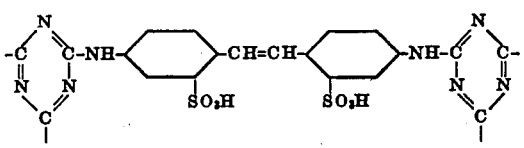

wherein at least one of the free valencies is taken up by an amino group, the remaining free valencies being taken up by a member selected from the group consisting of amino, phenylamino, sulfophenylamino and carboxyphenylamino, with an excess of formaldehyde.

3. A process for the manufacture of a water-soluble condensation product, which comprises heating in alkaline solution for a period of one to several hours a stilbene-triazine compound of the formula

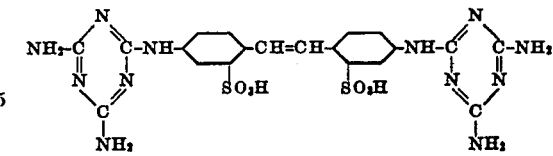

with an excess of formaldehyde.

4. A process for the manufacture of a water-soluble condensation product, which comprises heating in alkaline solution for a period of one to several hours a stilbene-triazine compound of the formula

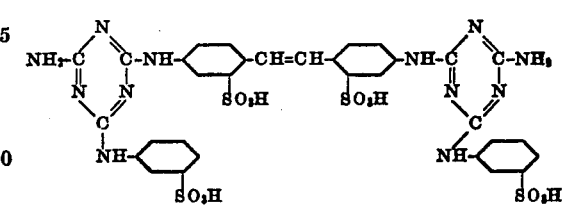

with an excess of formaldehyde.

5. A process for the manufacture of a water-soluble condensation product, which comprises heating in alkaline solution for a period of one to several hours a stilbene-triazine compound of the formula

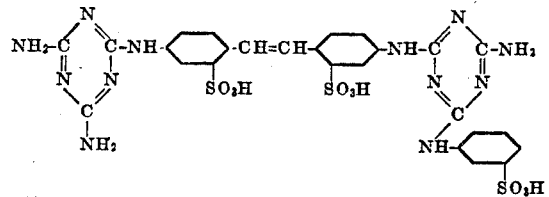

with an excess of formaldehyde.

6. A water-soluble condensation product obtained by reacting a stilbene-triazine compound of the formula

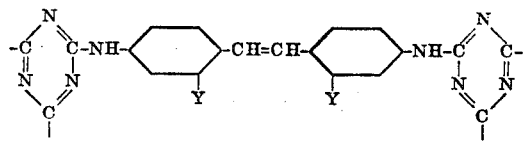

wherein the Y's represent identical members selected from the class consisting of the sulfonic acid group and the carboxylic acid group, and wherein at least one of the free valencies is taken up by an amino group, the remaining free valencies being taken up by a member selected from the group consisting of amino, phenylamino, sulfophenylamino and carboxyphenylamino, with an excess of formaldehyde.

7. A water-soluble condensation product obtained by reacting a stilbene-triazine compound of the formula

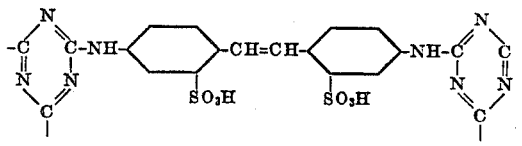

wherein at least one of the free valencies is taken up by an amino group, the remaining free valencies being taken up by a member selected from the group consisting of amino, phenylamino, sulfophenylamino and carboxyphenylamino, with an excess of formaldehyde.

8. A water-soluble condensation product obtained by reacting a stilbene-triazine compound of the formula

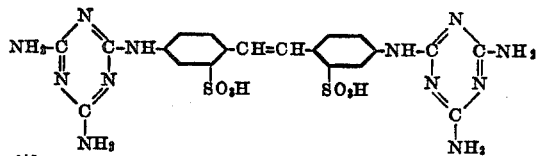

with an excess of formaldehyde.

9. A water-soluble condensation product obtained by reacting a stilbene-triazine compound of the formula

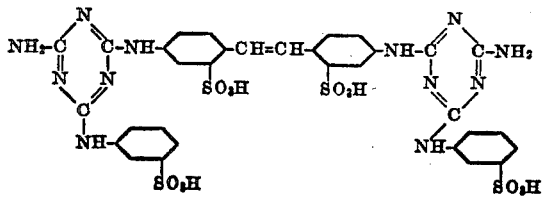

with an excess of formaldehyde.

10. A water-soluble condensation product obtained by reacting a stilbene-triazine compound of the formula

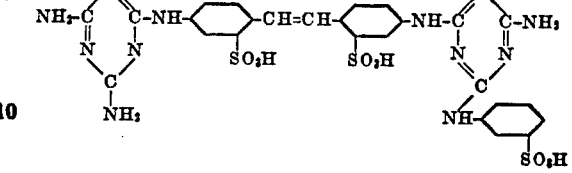

with an excess of formaldehyde.

11. A process for the manufacture of a water-soluble condensation product, which comprises heating in alkaline solution for a period of one to several hours a stilbene-triazine compound of the formula

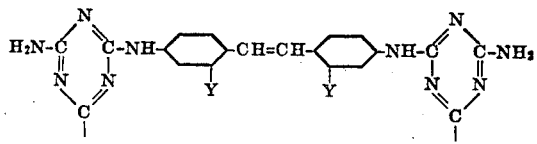

wherein the Y's represent identical members selected from the class consisting of the sulfonic acid group and the carboxylic acid group, the remaining free valencies being taken up by a member selected from the group consisting of amino, phenylamino, sulfophenylamino and carboxyphenylamino, with an excess of formaldehyde.

12. A water-soluble condensation product obtained by reacting a stilbene-triazine compound of the formula

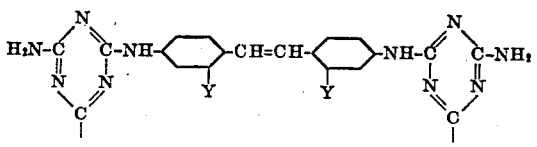

wherein the Y's represent identical members selected from the class consisting of the sulfonic acid group and the carboxylic acid group, the remaining free valencies being taken up by a member selected from the group consisting of amino, phenylamino, sulfophenylamino and carboxyphenylamino, with an excess of formaldehyde.

ERNST KELLER.
REINHARD ZWEIDLER.

REFERENCES CITED

The following references are of record in the file of this patent:

UNITED STATES PATENTS

| Number | Name | Date |
| --- | --- | --- |
| 1,033,757 | Fues | July 23, 1912 |
| 1,538,370 | Barrett | May 19, 1925 |
| 1,767,662 | Fulton | July 24, 1930 |
| 2,171,427 | Eggert | Aug. 29, 1939 |
| 2,274,363 | Foulds | Feb. 24, 1942 |